(12) United States Patent
Grube

(10) Patent No.: US 7,591,202 B2
(45) Date of Patent: Sep. 22, 2009

(54) GEAR BOX POWER CONTROL SYSTEM FOR A SMALL GASOLINE ENGINE

(76) Inventor: Donald Barton Grube, 1058 Double Springs Rd., Bokchito, OK (US) 74726

( * ) Notice: Subject to any disclaimer, the term of this patent is extended or adjusted under 35 U.S.C. 154(b) by 251 days.

(21) Appl. No.: 11/428,539

(22) Filed: Jul. 3, 2006

(65) Prior Publication Data

US 2008/0000321 A1   Jan. 3, 2008

(51) Int. Cl.
*F16H 19/00* (2006.01)
*F16H 57/04* (2006.01)
*F16H 57/02* (2006.01)
*B60K 17/00* (2006.01)

(52) U.S. Cl. ............... 74/321; 74/606 R; 180/344; 180/374

(58) Field of Classification Search ............ 74/640, 74/321, 322, 333, 334, 606 R; 180/344, 180/374, 384
See application file for complete search history.

(56) References Cited

U.S. PATENT DOCUMENTS

| 3,451,285 | A | * | 6/1969 | Snyder | ............... 74/364 |
| 5,799,395 | A | * | 9/1998 | Nording et al. | ........ 29/890.08 |
| 7,201,119 | B2 | * | 4/2007 | Tawarada et al. | ........ 123/41.44 |

* cited by examiner

Primary Examiner—Tisha D Lewis

(57) ABSTRACT

A gear box power control system is disclosed to be consisting of a centrifugal clutch with integral bell housing drive, a gear train for speed reduction and torque enhancement, an output jackshaft with an engaging system to disengage and engage engine power to a primary drive sprocket for chain operation. The engagement and disengagement of engine power is done by an integral engager remotely controlled by steel cable and hand lever. A motorized vehicle is disclosed as consisting of a standard bicycle frame or modified bicycle frame, a tricycle frame, a go-cart frame, and a paddle wheel boat frame all with the gear box power control system of present invention installed on a gasoline four cycle engine.

12 Claims, 10 Drawing Sheets

Section view A - A

Section view A - A

Section view B -B

25 & 26
4 typ.

GEAR BOX POWER CONTROL SYSTEM FOR A SMALL GASOLINE ENGINE

TECHNICAL FIELD OF THE INVENTION

This invention relates to a gasoline internal combustion four-cycle engine power-assisted vehicle, in which a horizontal shaft engine is utilized to self propel a vehicle, particularly but not exclusively a bicycle, a tricycle, a go-cart, a paddle boat and similar vehicles, and to its application being extended to a stationary engine work station utilized to chain drive a work wheel or driven axel requirement.

BACKGROUND OF THE INVENTION

In developed countries, bicycling and pedal boating are enjoying preferred outdoor activities by many people, both are pleasant and healthful exercises. Riding a bicycle to work employment short distance locations is environmentally friendly transportation and less expensive than commuting by car, SUV or pickup truck using high fuel consumption. Therefore, it is not surprising that bicycles, tricycles, go-carts are utilized as dominant means of transportation in developing countries especially in rural and remote areas and represent a market challenge for motorizing said vehicles. Light weight vehicles such as a motorized bicycle have a niche market place below that of motorcycles and commercial mopeds. Even in developed countries that are experiencing high fuel cost alternative modes of transportation is becoming increasingly popular such as bicycles, mopeds, scooters, and motorcycles.

Conventional vehicles such as bicycles, tricycles, go-carts and paddle boats are limited by their human-power abilities. Some people cannot pedal a bicycle, tricycle or go-cart while others become tired easily especially in mountainous or hilly areas. It is difficult to pedal a paddle wheel boat for long distance or up stream in a rapid flowing stream that might also be dangerous to such users.

Several variations of basic motorized bicycle gasoline engine kits have been developed for end users in the prior art. Some of these incorporate two-cycle gasoline engines using oil/gasoline mixture that are no longer been allowed by EPA for importation after Jan. 1 of 2006 for on road use due to high exhaust air pollution resulting from mixing oil and gasoline in combustion. Most of these types of engines have been imported from China until recently. Other prior art motorized bikes incorporate rudimentary exposed belt or chain drives with engines mostly mounted over the rear wheel or inside the frame and without any way to mechanically disengage engine power at rpm above clutch operation without killing the engine. Nor does prior art offer a commercially available gearbox control system to allow a small off the shelf 4 cycle engine to do efficient work so intended by an end user described herein.

There exists some electric motor-based bicycles but they have limited low power for hill-climbing and the inability to recharge batteries away from electrical outlets. Gas stations remain the most prevalent present source for vehicle refueling in the USA. The design of an end user specialized engine kit to motorize a standard V frame bicycle and also meet EPA regulation for gasoline engine emission in the prior art are too complex to manufacture due to the obligation for an exclusive EPA approved engine not yet available on the market to replace two-cycle engine bicycle kit variants. The present invention utilizes a standard four-cycle gasoline engine already approved by EPA and readily available in the Original Equipment Manufacture known as OEM, dealer aftermarket. Such newly designed high rpm engines are now made in cc displacement below 50 cc where by making them legal to use on motorized bicycles for on road use in many states in USA.

The present invention provides an end user a way to motorize a vehicle by using a standard EPA approved easily obtainable aftermarket high rpm four-cycle gasoline engine without any modification. As further recognized by the present invention, it is an accoutrement apparatus component that enables an end user to apply a small four-cycle gasoline engine to a chain drive work related wheel type load requirement and gain gear reduction speed and torque with the benefit of engine power engagement control. An object of the present invention is to provide a gear box power control system to motorize a vehicle without the utilizing drive belts or sheave pulleys or driving to a pedal crank shaft in any way, thus gaining the advantage of safety and complete control of engine power engagement. Another object of the present invention is to provide a practical way to drive a work related wheel or axel requirement, but not exclusively limited to, motorizing bicycles, motorizing tricycles, motorizing paddle wheel boats, and motorizing pedal go carts for on road or off road use.

SUMMARY OF THE INVENTION

A motorized vehicle is disclosed by typical exemplification that includes a standard bicycle V frame or a modified bicycle V frame having a front wheel and a rear wheel attached thereto and a seat for people pedaling a chain wheel sprocket. A small four-cycle gasoline engine with displacement from 30 cc to 80 cc is mounted in the middle of the bicycle V frame. The invention is disclosed as a gear box power control system, hereafter referred to as power control system. Said power control system having a prior art counterclockwise rotational direction, CCW, centrifugal clutch and primary drive gear to be installed as an assembly on a engine output shaft and working in conjunction with a gear box assembly having an integral engager system. The gear box assembly attached to an engine accessory drive mounting flange with four bolts. A drive chain attaches to an output jackshaft of the power control system via a small primary drive sprocket and goes to a much larger sprocket mounted on the left side of the rear wheel. This application is commonly referred to as moped.

A motorized vehicle is further disclosed that includes a tricycle frame, a modified or standard tricycle frame having a front wheel and two rear wheels attached thereto and a seat for people pedaling a chain wheel sprocket. A small four-cycle gasoline engine from 30 cc to 150 cc displacement is mounted in the middle of the tricycle V frame. The power control system having a centrifugal clutch and primary drive gear to be installed as an assembly on a engine output shaft and working in conjunction with a gear box assembly having an integral engager system. The gear box assembly attached to an engine accessory drive mounting flange with four bolts. A drive chain attaches to the output jackshaft of the power control system via a small primary drive sprocket and goes to a much larger sprocket mounted on the rear axel of the tricycle.

Moped function referred to above incorporates using a gasoline engine that can be pedal started, electric started or rope pull started and then the driven wheel used to do work to propel the rider. The driven wheel can be operated in different modes with engine on or off. a) engine off mode: By leaving the engager on the power control system in the open position a driven wheel can freewheel coast or be driven by other means as with a people powered pedal sprocket; b) engine on mode: With the gasoline engine running and the gear box jackshaft engager in the closed or engaged position, engine power is converted in a step down speed ratio enhancement into engine rpm; c) operator control: Engine operator has full control to engage power or to disengage engine power at any time thus gaining an important safety and engagement enhancement advantage; d) Engine running with engager in the open position allows for carburetor adjustments at high engine rpm without the driven work wheel turning.

A motorized vehicle is further disclosed that includes a paddle boat normally found as a personal pleasure small boat incorporating one to four people seats. A small four-cycle gasoline engine is mounted to the boat framework. The small four-cycle gasoline engine from 30 cc to 200 cc displacement is mounted in the boat framework. The power control system having a centrifugal clutch and primary drive gear to be installed as an assembly on a engine output shaft and working in conjunction with a gear box assembly having an integral engager system. The gear box assembly is attached to an engine accessory drive mounting flange with four bolts. A drive chain attaches to the output jackshaft of the power control system via a small primary drive sprocket and goes to a much larger sprocket mounted on the boat paddle wheel shaft.

A motorized vehicle is further disclosed as being a go-cart having four wheels on two axels, a steering wheel and seat for the operator and or passenger. A go-cart may be in many configurations and work applications to include light cargo hauling or for people transportation. A small gasoline engine is mounted to the go cart frame. A small four cycle gasoline engine from 30 cc to 200 cc displacement is mounted in the go-cart framework. The power control system having a centrifugal clutch and primary drive gear to be installed as an assembly on a engine output shaft and working in conjunction with a gear box assembly having an integral engager system. The gear box assembly is attached to an engine accessory drive mounting flange with four bolts. A drive chain attaches to the output jackshaft of the power control system via a small primary drive sprocket and goes to a much larger sprocket mounted on the rear drive axel of the go-cart.

A stationary engine work station can be further disclosed as work station requiring small four-cycle engine to turn an axel shaft such as would be typicality found using a circle saw to cut wood but not exclusively. A small four-cycle gasoline engine from 30 cc to 200 cc displacement is mounted on the work station frame. The power control system having a centrifugal clutch and primary drive gear to be installed as an assembly on an engine output shaft and working in conjunction with a gear box assembly having an integral engager system. The gear box assembly is attached to the engine accessory drive mounting flange with four bolts. A drive chain attaches to the output jackshaft of power control system via a small primary drive sprocket and goes to the intended work load requirement.

To be able to use an off the shelf aftermarket EPA emissions approved high tech four-cycle small gasoline engine of normally 30 cc to 200 cc displacement, but not limited to, said displacement for applications requiring a driven wheel to do work with a reduced ratio speed, thus gaining torque enhancement and have complete control with an engager system that is remote controlled by steel cable and lever. Such applications can be, but not exclusively limited to, motorizing bicycles, tricycles, paddle boats, and pedal go carts. Engine running with engager in the open position or disengaged position allows for high rpm engine operation without the driven work wheel turning as such would be needed when setting carburetor adjustments for correct air fuel mixture.

BRIEF DESCRIPTION OF THE DRAWINGS

The present invention will be understood more fully from the detailed description of the preferred embodiments given below, from the appended claims and from the accompanying drawings. The description of specific embodiments are used to explain and understand the invention, should not be taken to limit the scope of the invention.

FIG. 3 also shows the centrifugal clutch gear 13 driving a larger gear 15 that has a smaller gear 17 affixed solid to it on the same shaft and the smaller gear 17 driving the final drive gear 19. The final drive gear 19 rides on an inserted bronze bushing that allows the final drive gear 19 to spin freely on the jackshaft 18 when turned by the gear 17. Four engine mounting bolt holes are shown by 26 in cast housing 10 and are for attach bolts going to engine threaded holes 25 shown in FIG. 7. Two engine mounting bolts going through the holes in the outboard two hole lugs of casting 10 are the same two bolts used in the two corresponding two hole lugs 26 in cast housing 11. These said two bolts are longer than the remaining two shorter attach bolts used approximately midway of cast housing 10. Thus four bolts hold the gear box power control system to the engine, two long ones on the outboard hole lugs of cast housings 10 & 11 and two short bolts inside the power control system approximately midway of the cast housing 10.

Figure 4:
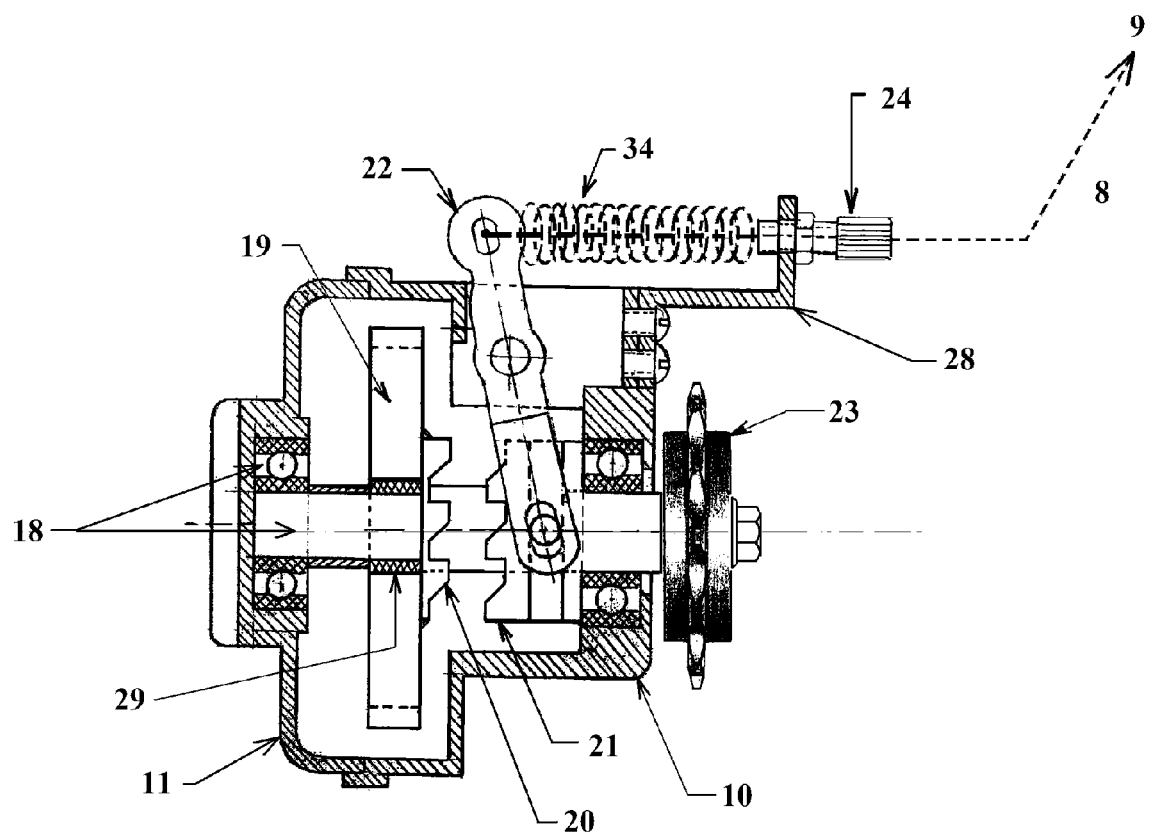
FIG. 4 is a section view B-B as denoted on FIG. 3 showing a ball bearing supported jackshaft 18 that supports the final drive gear 19. The final drive gear 19 has an engagement gear 20 welded to it. Engagement gears 20 & 21 and a shift lever control 22 are major components of the engagement system. The outboard engagement gear 21 rides on a long key in the jackshaft 18, thus enabling the shaft to turn and transmit engine torque when the outboard sliding engagement gear 21 is coupled to the fixed engagement gear 20 on the final drive gear 19. The sliding engagement gear 21 is controlled by a pivoted lever 22 with twin forked arms. The arms on pivoted lever 22 fit on two buttons 30 on a ring 32 fitted on sliding engagement gear 21 as depicted on FIG. 9A as primary design. The pivoted lever 22 is controlled by an affixed external steel cable 8 to a hand lever 9 in FIG. 1. A primary drive chain sprocket 23 for the output drive chain going to the intended work load requirement is attached to the outboard end of the jackshaft 18. It is further indicated in FIG. 2, FIG.

3 and FIG. 4 that the final drive gear 19 is not affixed to the jackshaft 18 but rides on a bronze bushing 29 thus allowing the final drive gear 19 to spin freely on the jackshaft 18 when turned by gear 17 and there by being able to engage the sliding engagement gear 21 to transmit engine torque to the jackshaft 18 and output primary drive sprocket 23.

Figure 5:
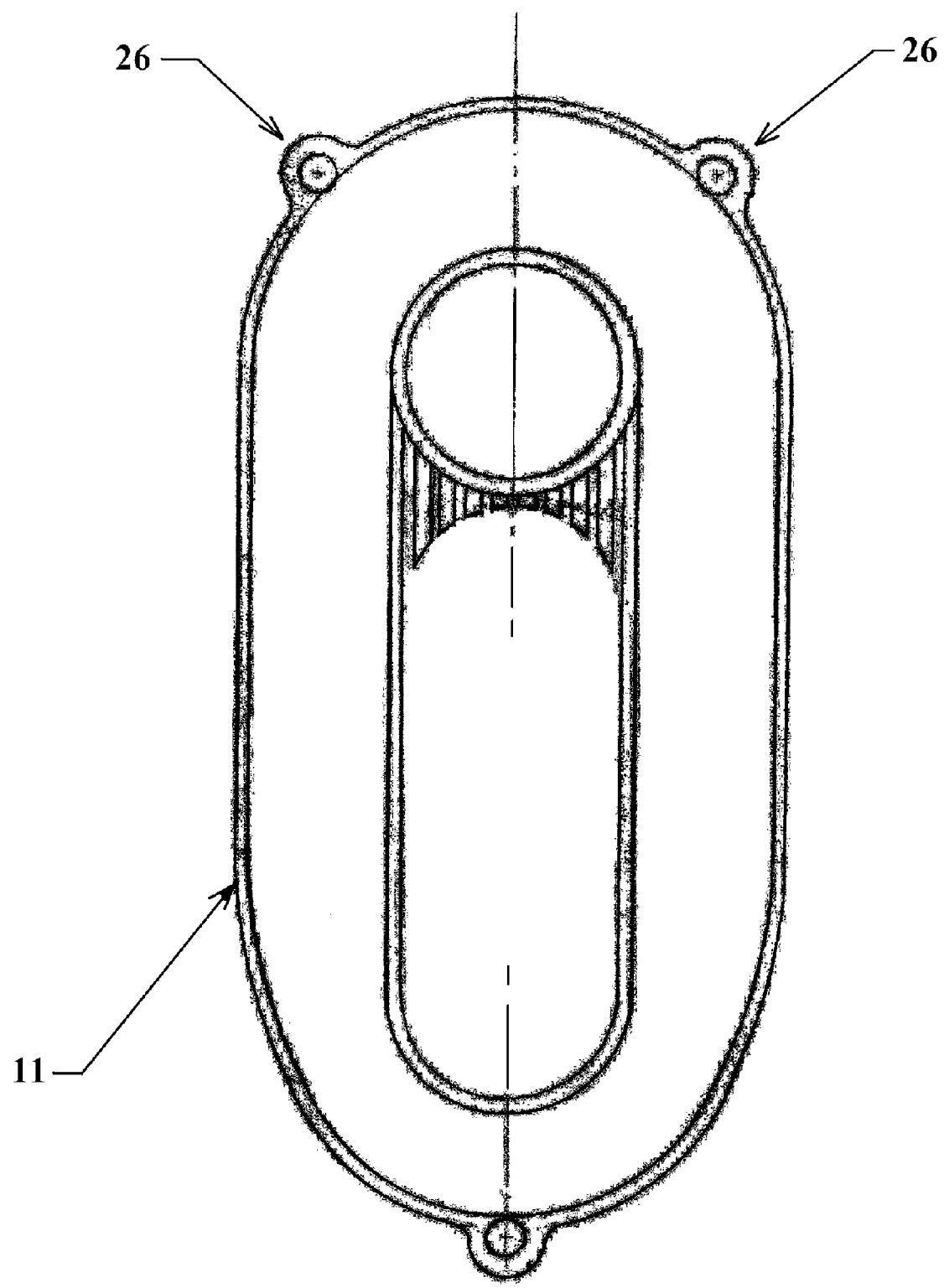

FIG. 5 shows the cast housing 11 of the gear box power control system with two bolt hole lugs 26 that line up with two corresponding bolt hole lugs 26 of the cast housing 10. Two long attach bolts first go through holes 26 of cast housing 11 and on through to the corresponding two bolt hole lugs 26 on cast housing 10 and help hold the assembly together by compression and also extend on into the engine mounting flange threaded holes 25. The single bolt hole lug on casting 11 opposite the two others is for a shorter bolt used to compress and secure the cast housing 10 at the same corresponding bolt hole lug. Thus the three bolt hole lugs with three bolts inserted and tightened form a three bolt lock pattern holding the gear box power control system together.

Figure 6:
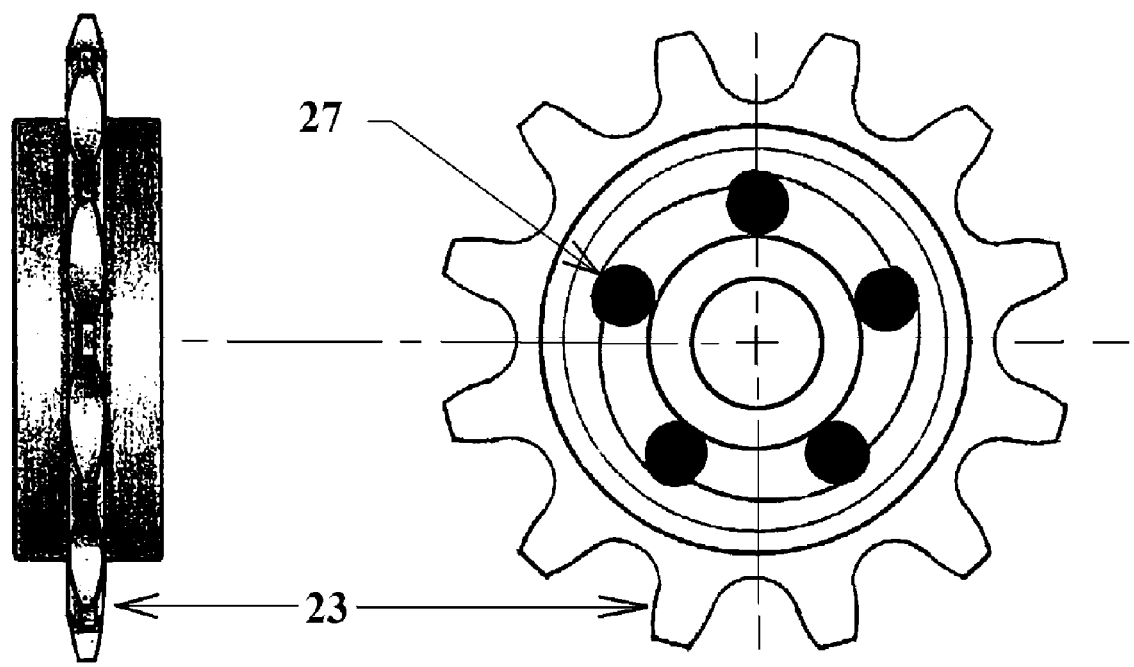

FIG. 6 shows vertical and flat views of a freewheel primary drive sprocket 23 and the five roll overrunning clutch rollers shown as 27 in slide cams.

Figure 7:
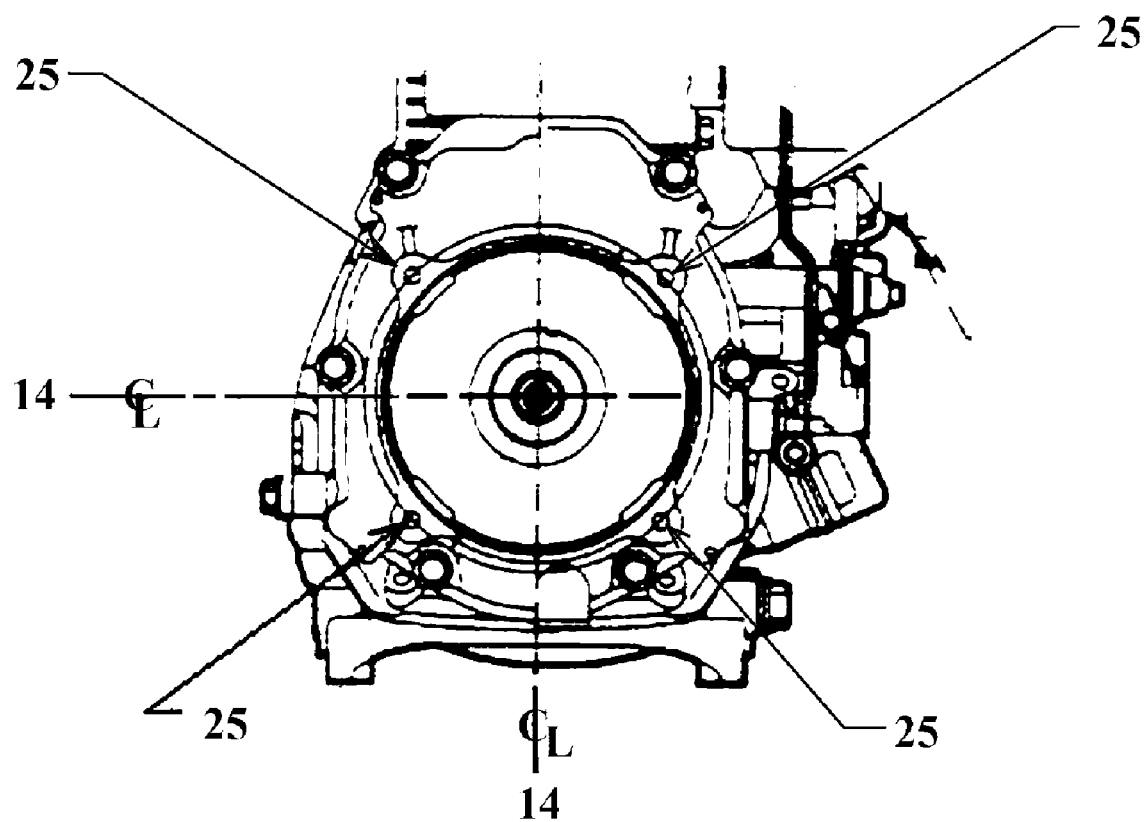

FIG. 7 is a typical small four-cycle vertical cylinder, horizontal output shaft, CCW rotation, engine used with present invention. FIG. 7 shows the output shaft center lines called out as CL and four bolt accessory drive mount flange threaded holes 25 for attaching the power control system 1.

Figure 8:
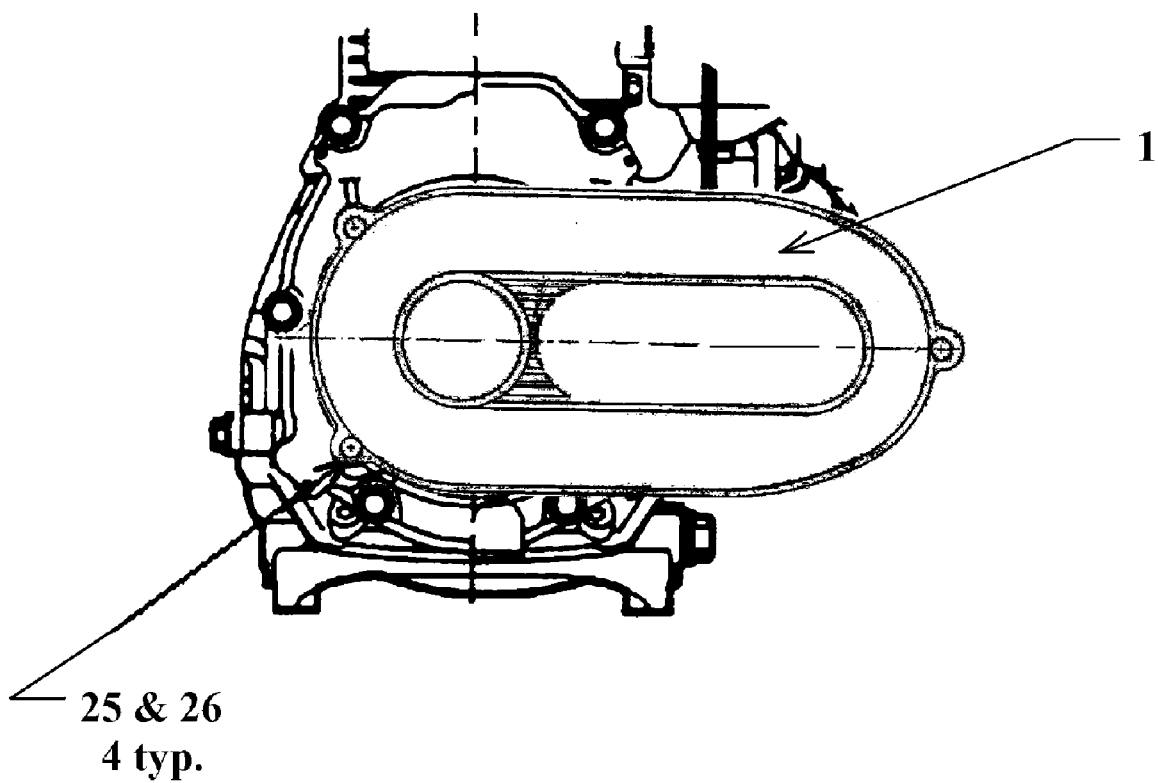

FIG. 8 is a typical small four-cycle gasoline internal combustion engine with vertical cylinder having a counter-clockwise rotation horizontal shaft output with the gear box power control system 1 shown affixed by four bolt hole patterns 25, 26 to the engine. Two bolts on the left side are visible in the drawing and two bolts are invisible due to being hidden from view inside the power control system. The power control system 1 is attached to the engine by two long mounting bolts going through four hole lugs 26 in the cast housings 11 & 10 and two shorter bolts inside the gear box on casting 10 going through holes 26 approximately midway of cast housing 10. Obviously the two shorter bolts in casting 10 approximately midway must be affixed first to the engine before the cover casting 11 is installed. Therefore, it makes a four bolt mounting for the power control system 1.

Figure 9:
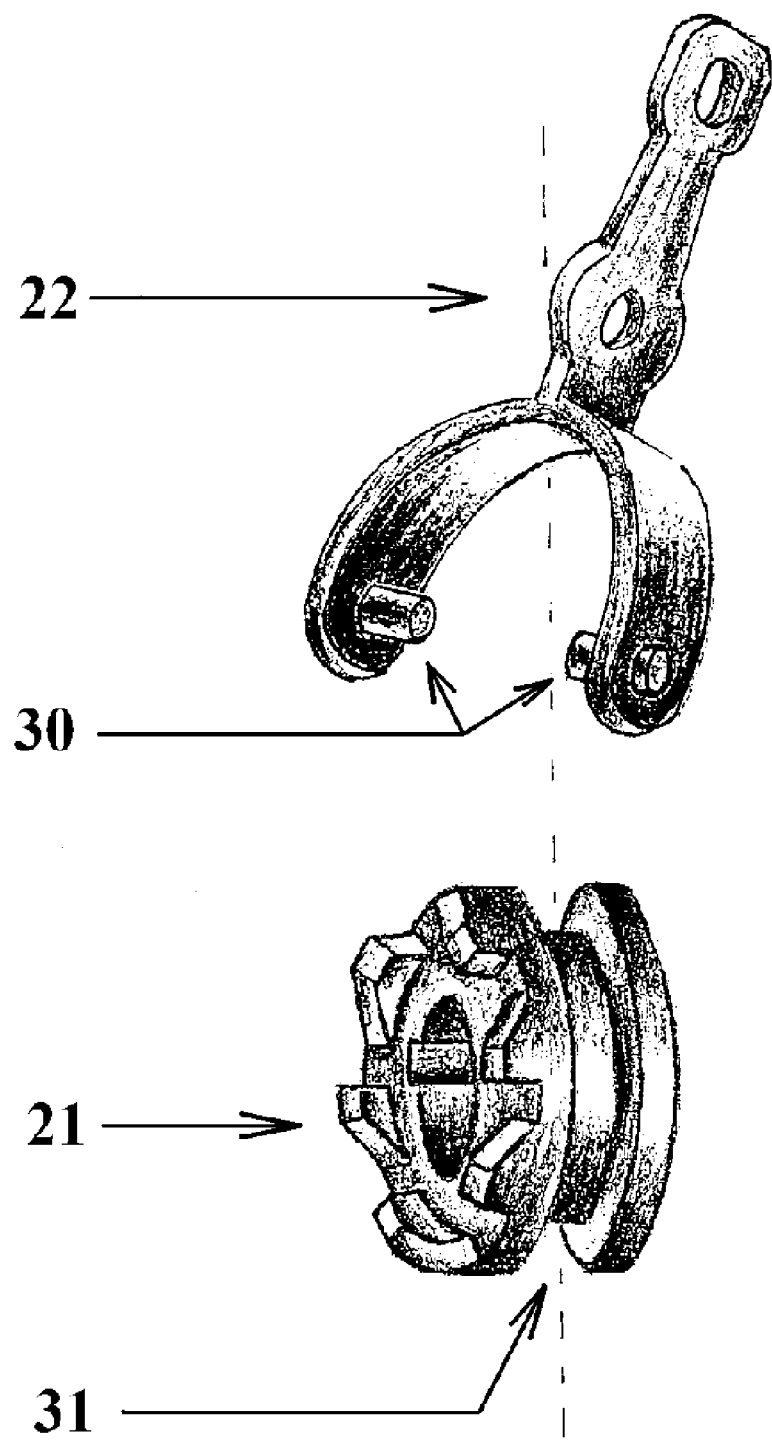

FIG. 9 shows the sliding engager gear 21 and shift lever 22 with forked arms having two buttons 30 made of hardened grade steel that ride in a grooved slot in the peripheral diameter of the engager gear 21. This is an alternative design: Lever buttons comprises one way to move the sliding engager.

Figure 9A:
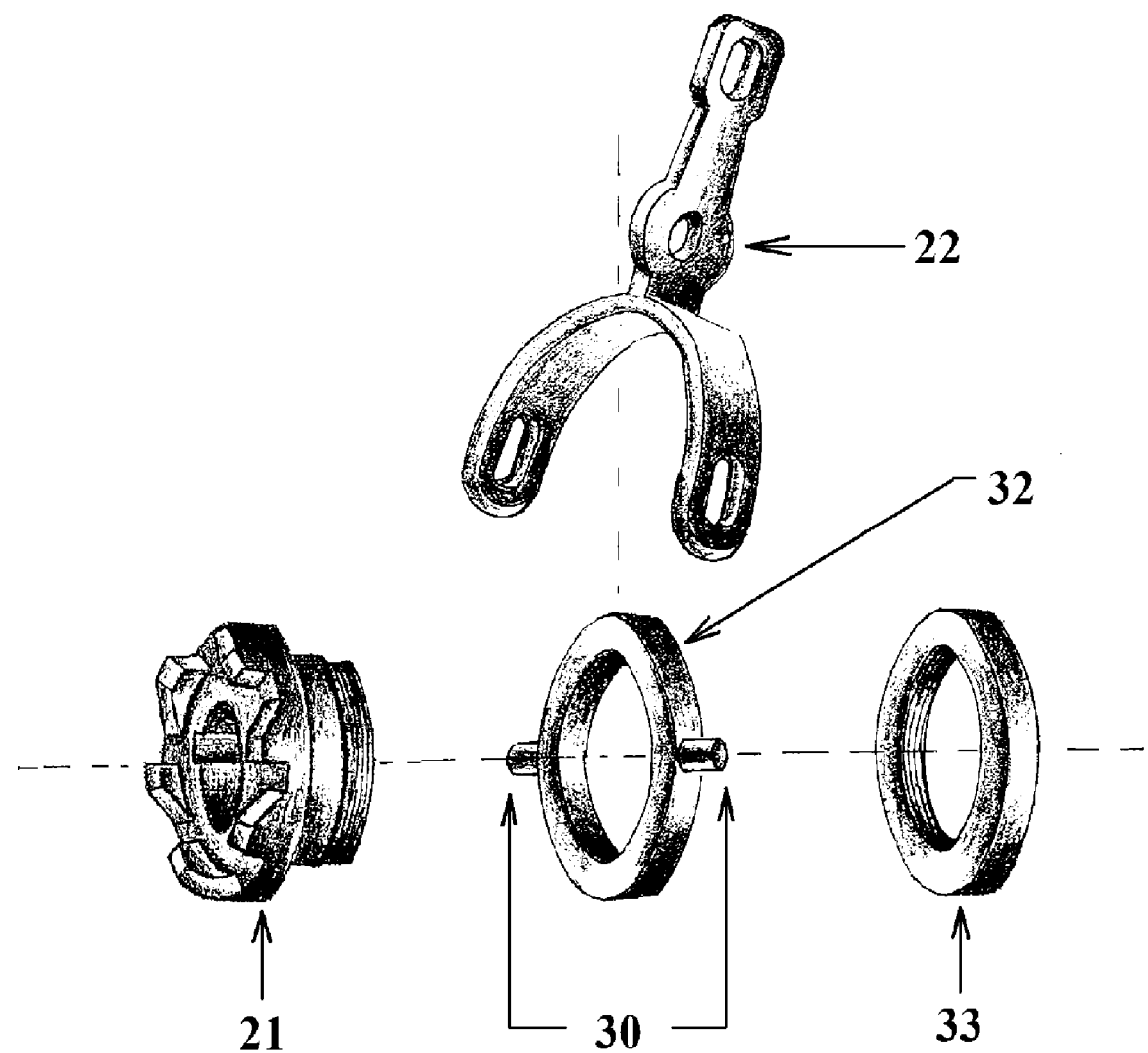

FIG. 9A shows the primary design to include a steel or plastic ring 32 with outboard buttons 30 to be installed on sliding engager gear 21 with a shift lever 22 having holes in the arms to fit over the ring buttons thus requiring a two piece sliding engager gear having an outboard flange 33 secured by threads or lock ring.

DETAILED DESCRIPTION OF THE PREFERED EMBODIMENTS

EXAMPLE 1

A motorized bicycle is disclosed as an exemplification that includes a standard bicycle V frame or a modified bicycle V frame having a front wheel and a rear wheel attached thereto and a seat for people pedaling a chain wheel sprocket. A small four-cycle gasoline engine with displacement from 30 cc to 80 cc is mounted in the middle of the bicycle V frame. The invention is disclosed as a gear box power control system, hereafter referred to as power control system. The power control system having a prior art counterclockwise rotational direction, CCW, centrifugal clutch and primary drive gear to be installed as an assembly on a engine output shaft and working in conjunction with a gear box assembly having an integral engager system. The gear box assembly attached to an engine accessory drive mounting flange with four bolts. A drive chain attaches to an output jackshaft of the power control system via a small primary drive sprocket and goes to a much larger sprocket mounted on the left side of the rear wheel.

The drawings of FIGS. 1 to 9A are used to interpret the present invention with specification description but not used to limit the scope of the invention.

Figure 1:
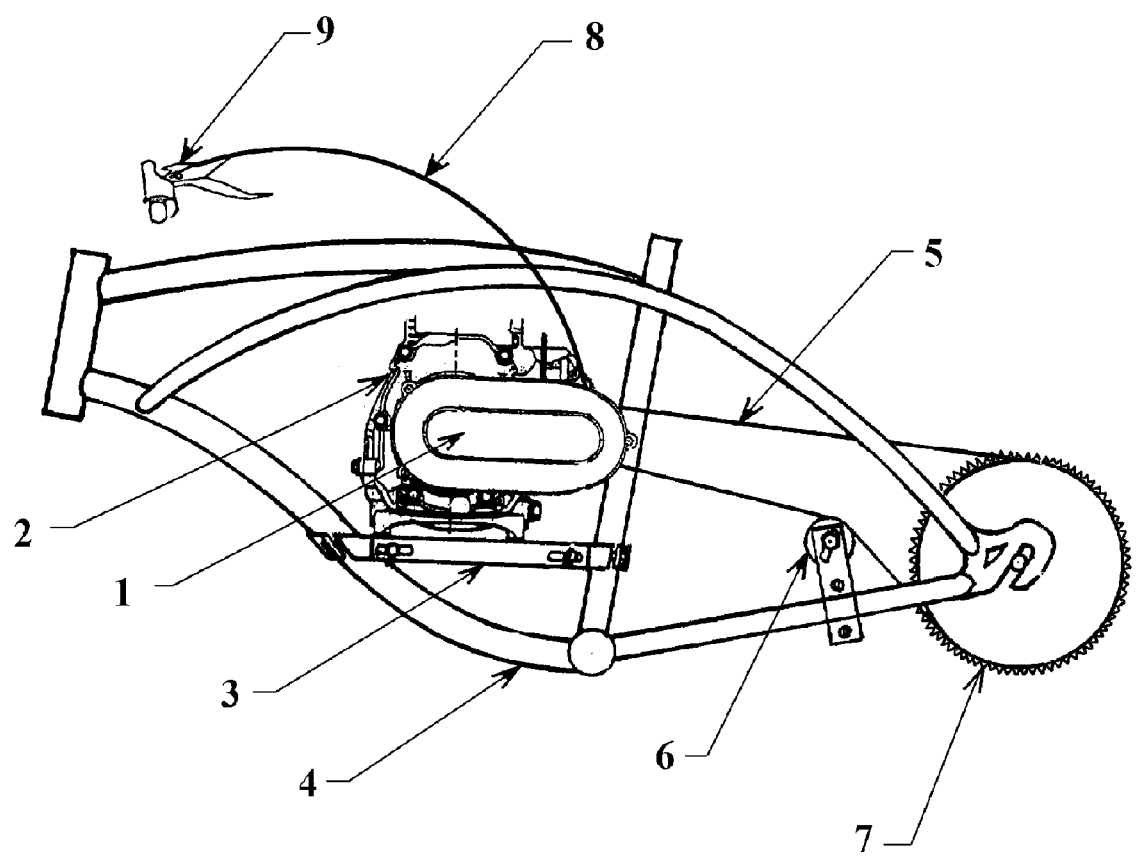
FIG. 1 is a typical exemplification of the invention as would be applied on a bicycle. Other applications that could be utilized would work in the same manner as on a bicycle. The gear box power control system, hereafter referred to as power control system, of present invention is designated as 1.

FIG. 1 is a typical state of the art bicycle frame 4 such as may be used to hold an engine 2 on a slide adjustable bracket 3 whereby an end user could attach a gear box power control system 1 to the engine 2. The gear box power control system is housed inside a two-piece aluminum die cast housing referred to as cast housings 10 & 11 with an external cable controlled lever apparatus 8, 9 for the an engager system in gear box power control system 1.

Figure 2:
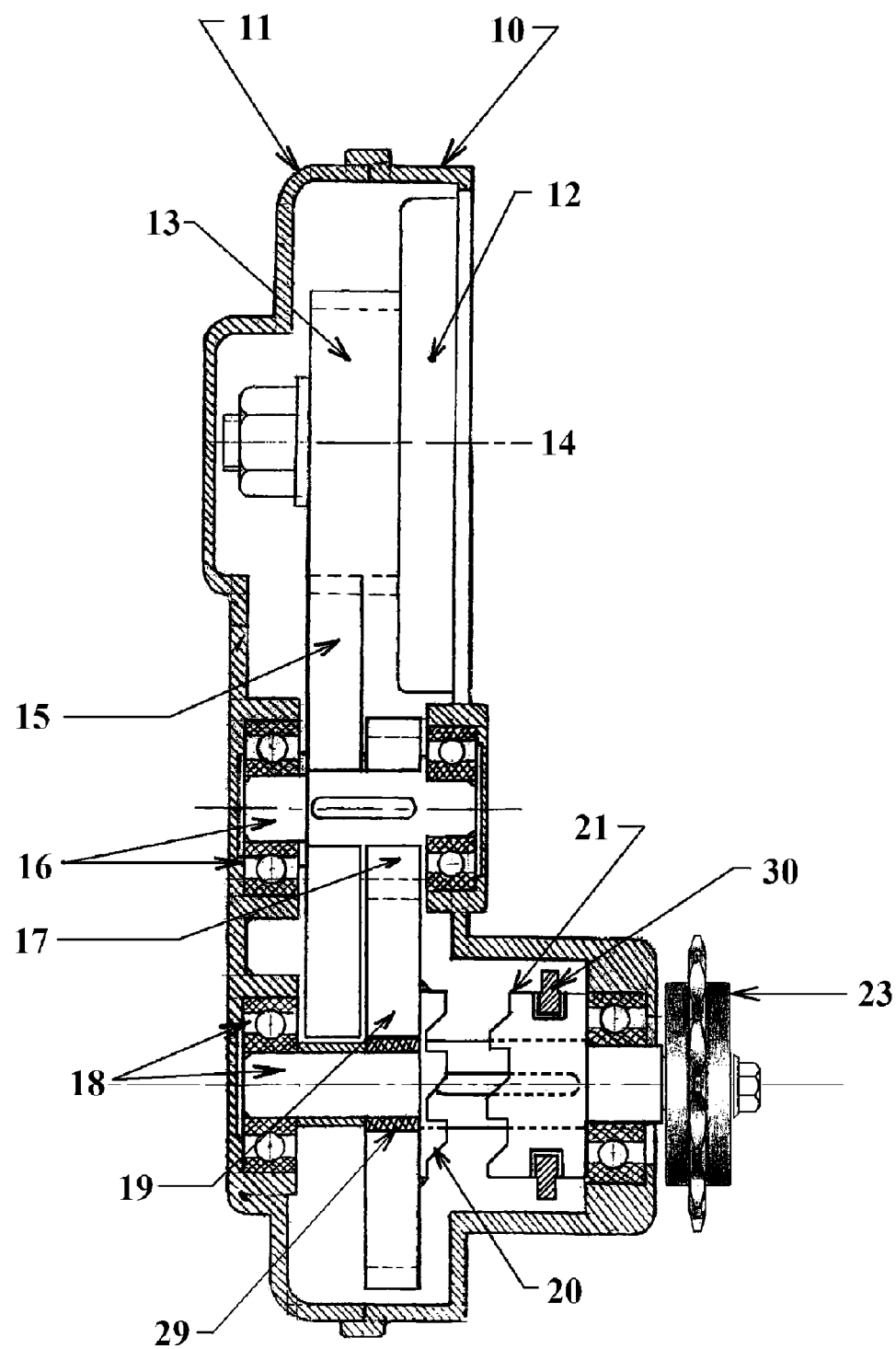
FIG. 2 is a cross-sectional view A-A of the gear box power control system consisting of cast housings 10 & 11 and all internal components. A centrifugal clutch assembly 12 with a centrifugal clutch gear 13 is shown working in conjunction with the gear box power control system. The centrifugal clutch gear 13 is a primary drive gear and a small diameter spur gear. Section A-A shows gear train arrangement and power transmission from the centrifugal clutch 12 to the primary drive gear 13, from the primary drive gear 13 to a series gears 15 and 17 to the final drive gear 19 on jackshaft 18, thereby going to the engager control system and primary drive sprocket 23. Sectional A-A is called out on FIG. 3.

FIG. 2 is a cross sectional view A-A of the gear box control system including cast housings 10 & 11 and all internal components. A centrifugal clutch 12 and primary drive gear 13 with access to the gear box power control system through a large circle hole in the cast housing 10. Section A-A shows gear train arrangement and power transmission from the centrifugal clutch 12 to primary drive gear 13, form the primary drive gear 13 to a series of gears 15 and 17 to the final drive gear 19 on jackshaft 18, thereby going to the engager control system and primary drive sprocket 23. Sectional A-A is called out on FIG. 3.

Figure 3:
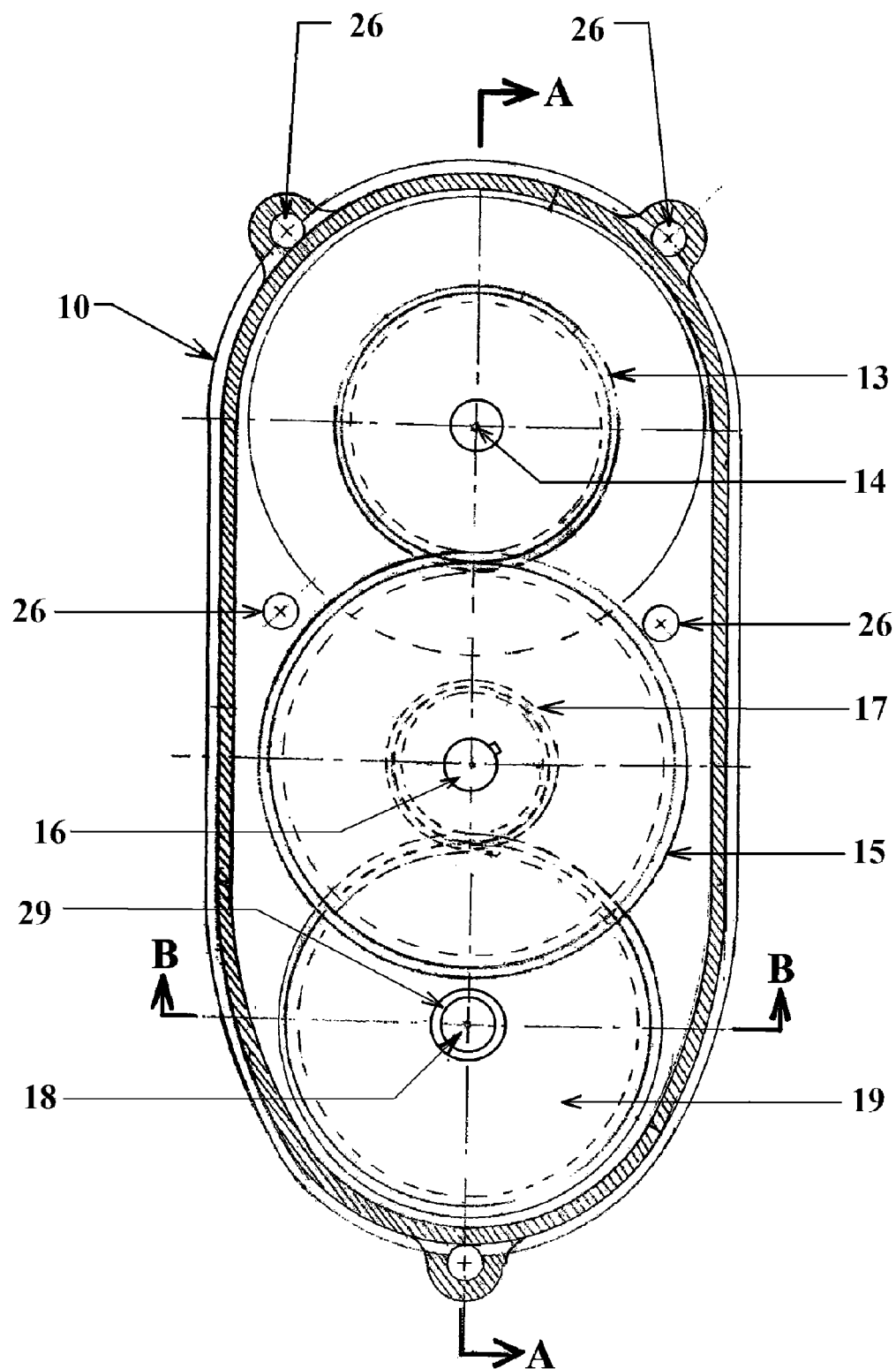
FIG. 3 shows the gear train layout in the horizontal flat position. The gears used to transmit power during engine running mode are shown in relationship to each other with the gears operating on ball bearing supported shafts 16 & 18.

FIG. 3 shows the centrifugal clutch gear 13 driving a larger gear 15 that has a smaller gear 17 affixed solid to it on the same shaft and the smaller gear 17 driving the larger final drive gear 19. The final drive gear 19 rides on an inserted bronze bushing that allows the final drive gear 19 to spin freely on the jackshaft 18 when turned by gear 17. Four engine mounting bolt holes are shown by 26 in cast housing 10 and are for attach bolts going to engine threaded holes 25 shown in FIG. 7. Two engine mounting bolts going through the holes in the outboard two lugs of casting 10 are the same two bolts used in the two corresponding hole lugs 26 in cast housing 11. These said two bolts are longer than the remaining two shorter attach bolts used approximately midway of cast housing 10. Thus four bolts hold the gear box power control system to the engine, two long ones on the outboard lugs of cast housings 10 & 11 and two short bolts inside the gear box approximately midway of cast housing 10.

FIG. 4 is a section view B-B as denoted on FIG. 3 showing a ball bearing supported jackshaft that supports the final drive gear 19. The final drive gear 19 has the engagement gear 20 welded to it. Engagement gears 20 & 21 having angled teeth for ease of engagement and a shift lever 22 are major components of the engagement system. The outboard engager gear 21 is controlled by a pivoted lever 22 with twin forked arms. The pivoted fork lever 22 is controlled by an affixed external cable 8 to a hand lever 9. A primary drive chain sprocket 23 for the output drive chain going to the intended work load requirement is attached to the outboard end of the gear box jack shaft 18. It is shown in FIG. 2, FIG. 3 and in FIG. 4 that final drive spur gear 19 is not affixed to the jackshaft 18 but rides on an inserted bronze bushing 29 that allows the final drive gear 19 to spin freely on the jackshaft 18 when turned by gear 17, and thereby being able to engage the sliding engagement gear 21 to transmit engine torque to the jackshaft and on to the output drive sprocket 23. The outboard engagement gear 21 is controlled by a pivoted lever fork 22.

The pivoted fork lever is controlled by an affixed external cable to a hand lever. A primary drive chain sprocket 23 for the output drive chain going to the intended work load requirement is attached to the outboard end of the jackshaft 18.

FIG. 5 shows the cast housing 11 of the gear box power control system with two bolt hole lugs 26 that line up with two corresponding bolt hole lugs 26 of the cast housing 10. Two long attach bolts first go through holes 26 of cast housing 11 and on through to the corresponding two bolt hole lugs 26 on cast housing 10 and help hold the assembly together by compression and also extend on into the engine mounting flange threaded holes 25. The single bolt hole lug on cast housing 11 opposite the two others is for a shorter bolt used to compress and secure cast housing 10 at the same corresponding bolt hole lug. Thus the three bolt hole lugs with three bolts inserted and tightened form a three bolt lock pattern holding the gearbox power control system together.

FIG. 6 shows vertical and flat views of a freewheel primary drive chain sprocket 23 and the five roll overrunning clutch rollers shown as 27 in slide cams.

FIG. 7 is a typical small four cycle vertical cylinder horizontal output shaft CCW rotation engine used with said invention. FIG. 7 shows the output shaft center lines called out as CL and four bolt accessory drive mount flange threaded holes 25 for attaching the power control system 1.

FIG. 8 is a typical small four-cycle gasoline internal combustion engine with vertical cylinder, having a counter-clockwise rotation horizontal shaft output shown with the gear box power control system 1 affixed by four bolt hole patterns 25, 26 to the engine. Two attach bolts are visible in the drawing and two attach bolts are invisible due to being hidden from view inside the gear box power control system.

FIG. 9 shows the sliding engagement gear 21 and shift lever 22 with forked arms having two buttons 30 made of hardened grade steel that ride in a grooved slot in the peripheral diameter of the engagement gear 21. This is an alternative design: Lever buttons comprises one way to move the sliding engagement gear 21.

FIG. 9A shows the primary design with a ring 32 with outboard buttons 30 to be installed on sliding engager gear 21 and a shift lever 22 having slotted holes in the arms to fit over the ring buttons 30 thus requiring a two piece sliding engager gear 21 having an outboard flange 33 secured on by threads or lock ring. This is the preferred intended system as shown in FIG. 2 and FIG. 4

In summary of above description, the gear box power control system 1 includes five essential components:

a) two-piece cast housings 10 & 11 to be attached to a small vertical single cylinder four-cycle engine horizontal output shaft four-bolt holes 25. The cast housings 10 & 11 can be made of other than die cast aluminum alloy should be any materials that are suitable to make said cast housings, including but non-exclusive to steels, plastics, and other materials available in the future;

b) three main gear train spur gears 15, 17, & 19 are supported on a two separate shafts with ball bearings support shafts 16, 18 inside the cast housings 11 & 10. The gear train used to transmit power in a step down mode normally in eighteen and half to one speed ratio but not exclusively. The speed ratio can be varied by using different spur gear diameters;

c) a centrifugal clutch 12 is attached to the engine output crankshaft 14. The centrifugal clutch has an integral engagement bell housing affixed to the primary drive gear 13. When the engine is operating above a specified rpm usually about 1500 to 3000, the centrifugal clutch 12 engages the clutch integral bell housing and transmits engine torque through a series of spur gears in a train 13, 15, 17 and 19 in the cast housings 10 & 11 to the jackshaft 18.

d) a ball bearing supported output jackshaft 18 having one large diameter spur gear 19 which rotates freely on a bronze bushing. The spur gear 19 has a small fixed position engagement gear 20 attached to it and transmits power to the engager lever controlled system via engagement gear 21. The engagement gear 21 slides on a slotted way and key. The sliding engagement gear 21 is moved by a pivoted lever fork controlled by an external cable. The primary drive sprocket 23 is affixed to the outboard end of the jackshaft 18 for the output drive source to go to the applied driven wheel of the vehicle or stationary machine as required by the end user. This forms the integral engager assembly of the gear box power control system 1. The primary drive sprocket 23 used on the engager assembly jackshaft output end has an over running freewheel clutch 27 built in. It can be ten tooth to fourteen tooth as required by the work driven wheel application requirement and size of engine used. The installer or end user has the option of installing a freewheel primary drive sprocket 23 or a non freewheel primary drive sprocket on the output jackshaft 18. If a non freewheel sprocket is used on the jackshaft 18 the freewheel can be located in the driven wheel of the intended work load application 7;

e) an engager system with sliding engagement gear 13 being controlled by the shift lever 22 that is manipulated by the external cable 8 and hand lever 9.

Installation and operation: The gear box power control system 1 is attached to the engine by two long mounting bolts going through four hole lugs 26 in the cast housings 11 and 10 and two shorter bolts inside the gear box on cast housing 10 going through holes 26 approximately midway of cast housing 10. Obviously the two shorter bolts in cast housing 10 approximately midway must be affixed first to the engine before the cover cast housing 11 is installed. Therefore, this makes a four bolt mounting for the gear box power control system 1.

The gear box power control system 1 includes in kit form of three major assemblies as received by the end user in one cardboard box. a) Centrifugal clutch assembly. b) Cast housing 10 and all working parts factory pre-installed except for cover cast housing 11 having 2 ball bearings installed inside the cover casting. c) Cast housing 11 referred to as the cover cast housing and two ball bearings.

Installation step one: A centrifugal clutch assembly 12 with a primary drive gear 13 attached to the engagement bell housing is first attached to the engine output crankshaft 14 as step one. The centrifugal clutch has an integral engagement bell housing welded to a small diameter spur gear 13. When the engine is operating above a specified rpm usually about 1500 to 3000 depending on the engine used, the centrifugal clutch 12 engages the clutch integral bell housing and transmits engine torque through a series of spur gears in a train from gear 13 to gear 15, from gear 15 to gear 17 on the same shaft, and from gear 17 to the final drive gear 19.

Installation step two: Attach cast housing 10 with gear train and integral engager assembly factory pre-installed to a small vertical single cylinder four-cycle horizontal output shaft engine as shown in FIG. 7. Cast housing 10 is placed over the centrifugal clutch assembly 12 and primary drive gear 13 by way of a large hole in cast housing 10 and is first held on by two short bolts going through holes 26 approximately midway of the cast housing into two corresponding threaded holes 25 on the engine. A sealing gasket can be used if desired by the end user used between cast housing 10 and the engine mounting surface. Cast housing 10 can be made of any materials that are suitable to make the cast housings, including but non-exclusive die cast aluminum alloy, steel, plastic, and other materials that may be available in the future.

Installation step three: Attach the cover cast housing 11 having two ball bearings that line up with corresponding shaft 16 & jackshaft 18 in the cast housing 10. The cast housing 11 is then tapped into position with a rubber mallet to fit tightly over the cast housing 10 in a recessed lip around the perimeter. To insure correct ball bearing alignments in the cast housing 10 & 11 to shaft 16 & jackshaft 18, all machining of cast housings to be done on computer numerically controlled, commonly called CNC, machines at the factory. After cast housing 11 is in position two long bolts are inserted through the two left side lug mount holes 26 of both the cast housings 10 and 11 as shown in FIG. 8 and also extended into the threaded holes of the engine accessory drive mounting flange 25. A single third shorter bolt is installed through hole 26 on the right side of the cast housings 10 & 11 as shown in FIG. 8 and all three bolts tighten securely. The shift lever 22 with steel cable 8 attached going to hand lever 9 are preinstalled at the factory for ease of installation by the end user. The work load drive chain can now be installed as required. The cast housing 11 can be made of any materials that are suitable to make the cast housings, including but non-exclusive die cast aluminum alloy, steel, plastic, and other materials that may be available in the future.

Operation sequencing/relationship: Gear train spur gears 15, 17 operate on shaft and bearings 16, and the final drive gear 19 operates on a jackshaft with bearings 18. The gear train is used to transmit power in a step down speed ratio normally of about eighteen and half to one but not exclusively. The speed ratio can be varied by using different spur gear diameters as required in model variations;

A ball bearing supported output jackshaft 18 having final drive spur gear 19 which can rotate freely on a bronze bushing. The spur gear 19 has a small fixed position engagement gear 20 welded to it in centerline position and transmits power to the engager lever controlled system via engagement with sliding engagement gear 21. The engagement gear 21 slides on a long key inserted in a key way on the jackshaft 18 as shown on FIG. 4. The sliding engagement gear 21 is moved by a pivoted lever 22 controlled by an external cable 8 and hand lever 9. The shift lever 22 is made with twin half circular shaped fork arms having hole slots at the end of each arm that fit on a ring with buttons located on the sliding engagement gear 21 as shown on FIG. 9A or as an alternative design may be made as shown in FIG. 9 using buttons on each arm that fit in a grooved slot on the sliding engagement gear 21.

Operation theory using FIG. 9: Shift lever buttons 30 are positioned into a grooved slot 31 that extends the full circumference of the engagement gear 21. Thusly, the shift lever can push and pull the engager gear 21 to engagement or disengagement position and have no interference with rotation of the engager gear 21. A similar concept is used to push and pull a starter drive for engine ring gear engagement in an automotive DC electric cranking motor.

Operation theory using FIG. 9A: Shift lever 22 having slotted holes in the arms are positioned on two buttons 30 on a full circle ring 32 that is installed on sliding engagement gear 21 and held on by a flange 33 secured with threads or a lock ring. Thusly, the shift lever can push and pull the sliding engager gear 21 to engagement or disengagement position and have no interference with rotation of the engager gear 21. A similar concept is used to push and pull a starter drive for engine ring gear engagement in an automotive DC electric cranking motor. The full circle ring 32 may be made of steel or special composite plastic.

A primary drive chain sprocket 23 is affixed to the outboard end of the jackshaft 18 for the engine output drive source to go to the applied driven wheel of the vehicle or stationary machine as required by the end user; The workload chain maybe standard bicycle chain or a heavier 415 size chain but not exclusively. The width of the primary drive chain sprocket teeth can be varied to make model variations for different size of drive chains.

The small primary drive sprocket 23 used on the engager assembly jackshaft output end has an over running freewheel clutch consisting of five rollers 27 fitting in corresponding cam slopes built in as standard state of the art. Thus allowing freewheel operation in one direction and lockup in the opposite direction. The primary drive sprocket can be ten tooth, to fourteen tooth as required by the driven wheel work application requirement and size of engine used. The installer or end user has the option of installing a freewheel primary drive sprocket 23 or a non freewheel primary drive sprocket on the output jackshaft 18. If a non freewheel sprocket is used on the jackshaft 18 then a freewheel can be located in the driven wheel of the intended work load application 7 shown in FIG. 1.

The gear box power control system 1 enables a drive chain 5 to operate a work load requirement such as a sprocket 7 in a step down speed ratio and enabling a small engine to do efficient work. A prior art chain idler 6 provides chain tension adjustment for the drive chain 5.

The gear box power control system 1 has two available operator controlled operational modes when the engine is running:

a) Engager Closed position with engine running: When Engager gears 20 & 21 are in the closed engaged position with each other this allows engine power above centrifugal clutch engagement rpm in counter-clockwise rotation to travel via centrifugal clutch 12 to affixed spur gear 13 thus turning spur gears 15, 17 and 19 simultaneously. Spur gears 15, 17 and 19 operate on dual ball bearing supported shafts called out by 16 and 18 on FIG. 2. The fixed engager gear 20 attached to final drive gear 19 when closed with engager gear 21 turns the jackshaft 18 via the key or spines it rides on thereby rotating output sprocket 23 in the locked rational direction thus driving the chain 5 to the work related load requirement. The shift lever 22 holds the engagement gears 20 & 21 in the closed position due to the steel cable being locked closed by lever 9. The cable stop is 24 held on by bracket 28.

b) Engager Open position with engine running: When the end user operator has the cable control lever 9 in the unlocked open position the engager gears 20 and 21 have no contact with each other and no engine power is transmitted. The final drive spur gear 19 will spin freely on the jackshaft if the centrifugal clutch 12 is engaged. If the work related wheel is moving, the output sprocket 23 will freewheel over run and the jackshaft of the gear box will not turn spur gear 19. If the end user operator decides to re-engage the engine power to the closed position no matter if the vehicle is stopped or rolling the transition coupling of engager gears 20 & 21 is made smoothly when the shift lever 22 is moved by the operator via lever 9 attached to control cable 8. It should be noted that the angled teeth on both engagement gears 20 and 21 enhance smooth slide engagement. Compression spring 34 holds the shift lever 22 in the open position thus keeping the engagement gear 21 in the open position. The cable stop is 24 held on by bracket 28. If the vehicle is stopped the operator can adjust carburetor air fuel mixture settings at both idle and high rpm without worry of the work related wheel 7 turning. If need be in an emergency such as a centrifugal clutch 12 failure to disengage at low rpm or a work related wheel bearing failure or flat tire occurring the operator can quickly disengage engine power via the engager control cable 8 and lever 9 thus disengaging the coupling of engagement gears 20 & 21.

Engine off, not running mode: The gear box power control system should be left in the open position when engine is off or not running in preparation for the next engine start cycle. It should be noted that the installer has an option to use a prior art cable control hand lever with an electrical switch that is capable of grounding out the engine ignition should an engine start attempt be attempted while the engager of the power control system is in the closed position. The freewheel sprocket 23 on the engager jackshaft 18 will freewheel should the work related wheel be turning by means other than engine power such as would be case if pushing the vehicle or people pedaling a bicycle or pedaling a pedal wheel boat in normal vehicle operational manual mode.

Spur gears 13, 15, 17 and 19 are lubricated with grease for efficient operation and nose reduction. Centrifugal clutch 12 is intended to be a dry clutch operation however can be a wet clutch operating in an oil bath can be used in a totally sealed gear box power control system to make different model variations. The four ball bearings used on the gear shafts are the double sealed type with high temperature grease.

EXAMPLE 2

A motorized tricycle is further disclosed that includes a tricycle frame, a modified or standard tricycle frame having a front wheel and two rear wheels attached thereto and a seat for people pedaling a chain wheel sprocket. A small four-cycle gasoline engine from 30 cc to 150 cc displacement is mounted in the middle of the tricycle V frame. The power control system having a centrifugal clutch and primary drive gear to be installed as an assembly on a engine output shaft and working in conjunction with a gear box assembly having an integral engager system. The gear box assembly is attached to an engine accessory drive mounting flange with four bolts. A drive chain attaches to the output jackshaft of the power control system via a small primary drive sprocket and goes to a much larger sprocket mounted on the rear axel of the tricycle.

EXAMPLE 3

A motorized paddle boat is further disclosed that includes a paddle boat normally found as a personal pleasure small boat incorporating one to four people seats. A small four-cycle gasoline engine is mounted to the boat framework. The small four-cycle gasoline engine from 30 cc to 200 cc displacement is mounted in the boat framework. The power control system having a centrifugal clutch and primary drive gear to be installed as an assembly on a engine output shaft and working in conjunction with a gear box assembly having an integral engager system. The gear box assembly is attached to an engine accessory drive mounting flange with four bolts. A drive chain attaches to the output jackshaft of the power control system via a small primary drive sprocket and goes to a much larger sprocket mounted on the boat paddle wheel shaft.

EXAMPLE 4

A motorized go-cart is further disclosed as being a go-cart having four wheels on two axels, a steering wheel and seat for the operator and or passenger. A go-cart may be in many configurations and work applications to include light cargo hauling or for people transportation. A small gasoline engine is mounted to the go cart frame. A small four cycle gasoline engine from 30 cc to 200 cc displacement is mounted in the go-cart framework. The power control system having a centrifugal clutch and primary drive gear to be installed as an assembly on a engine output shaft and working in conjunction with a gear box assembly having an integral engager system. The gear box assembly is attached to an engine accessory drive mounting flange with four bolts. A drive chain attaches to the output jackshaft of the power control system via a small primary drive sprocket and goes to a much larger sprocket mounted on the rear drive axel of the go-cart.

EXAMPLE 5

A stationary engine work station can be further disclosed as work station requiring small four-cycle engine to turn an axel shaft such as would be typicality found using a circle saw to cut wood but not exclusively. A small four-cycle gasoline engine from 30 cc to 200 cc displacement is mounted on the work station frame. The power control system having a centrifugal clutch and primary drive gear to be installed as an assembly on an engine output shaft and working in conjunction with a gear box assembly having an integral engager system. The gear box assembly is attached to the engine accessory drive mounting flange with four bolts. A drive chain attaches to the output jackshaft of power control system via a small primary drive sprocket and goes to the intended work load requirement.

What is claimed is:

1. A gear box power control system for a motorized vehicle, said power control system comprising: a) a two-piece cast housing with internal components to be attached by four bolts via bolt holes in the cast housings to a small vertical single cylinder horizontal output shaft four-cycle engine; b) a centrifugal clutch with an engagement bell housing having an affixed spur gear meshing to make a drive train with 3 other spur gears supported on two separate shafts with ball bearings inside said cast housings utilized to transmit power in a designed step down mode from preferred in 18.5 to 1 speed ratio c) said centrifugal clutch having said engagement bell housing with said spur gear is attached to an engine output crankshaft, and transmits engine torque through a series of spur gears in said cast housings to an output jackshaft; d) a ball bearing supporting said output jackshaft having one large diameter spur gear rotating freely on a bronze bushing with small fixed position engagement gear transmiting power to an engager controlled system; e) said engager system with sliding engagement gear being controlled by a shift lever that is manipulated by external cable and hand lever.

2. The power control system according to claim 1, said power control system is mounted to said engine and affixed on with four bolts to an engine accessory drive mounting flange of said engine and said engine being mounted to a frame of said vehicle, and said power control system having a drive chain to operate a work load wheel or axel.

3. The power control system according to claim 1, said vehicle includes a bicycle, a tricycle, a go-cart, a paddle boat, or similar vehicles and also may include a stationary engine work station application.

4. The power control system according to claim 1, said cast housings can be made of other than die cast aluminum alloy and should be any materials that are suitable to make said cast housings, including steels, plastics, and other materials available in the future.

5. The power control system according to claim 1, said power control system has said sliding engagement gear having the ability to transfer engine torque to the jackshaft when engaged with the fixed engagement gear on a final drive gear.

6. The power control system according to claim 1, said power control system further comprising a primary drive chain sprocket with or without freewheel capability being affixed to the outboard end of said jackshaft for output drive source to go to applied driven wheel of vehicle or stationary machine as required by an end user.

7. The power control system according to claim 1, said engine is a small four-cycle gasoline engine with displacement from 30cc to 200cc, with a centrifugal clutch operating or engaging above a specified engine rpm from 1300 to 3000 depending on engine type and size to be used with an intended end use application.

8. The power control system according to claim 1, said engager controlled system having said aforementioned fixed engagement gear with angled teeth is affixed on a final drive gear as one piece and a separate movable adjacent sliding engagement gear with angled teeth rides on a shaft key which is controlled by a pivoted shift lever with an external lever controlled cable.

9. The power control system according to claim 2, said frame includes a standard or modified bicycle V frame, tricycle frame, boat framework, go-cart frame, and stationary engine work station frame.

10. The power control system according to claim 5, said sliding engagement gear can be optionally made to ride on a single straight key or on spiral spines cut on the jackshaft or on multi shaft keys pressed in the jackshaft.

11. The power control system according to claim 6, said primary drive sprocket be made solid and without freewheel a separate freewheel can then be installed on the work related driven wheel axel to accomplish the same affect as would have with said primary drive sprocket with said freewheel.

12. The power control system according to claim 6, said primary drive sprocket is 10 teeth to 14 teeth, and wide or narrow teeth as required by the work driven wheel application requirement chain size and size of engine used.

* * * * *